US005567373A

United States Patent [19]

Sato et al.

[11] Patent Number: 5,567,373

[45] Date of Patent: Oct. 22, 1996

[54] METHOD AND APPARATUS FOR MANUFACTURING A LIQUID CONTAINER HAVING PLURAL POROUS MEMBERS

[75] Inventors: Osamu Sato, Kawasaki; Hiroshi Sugitani; Tsuyoshi Orikasa, both of Tokyo; Toshihiko Ujita, Yamato; Masahiko Higuma, Togane; Yasuo Kotaki, Tokyo; Jun Hinami, Kawasaki, all of Japan

[73] Assignee: Canon Kabushiki Kaisha, Tokyo, Japan

[21] Appl. No.: 379,756

[22] Filed: Jan. 27, 1995

[30] Foreign Application Priority Data

Jan. 31, 1994 [JP] Japan .................................... 6-009876

[51] Int. Cl.[6] .............................. B29C 43/14; B41J 2/175

[52] U.S. Cl. .......................... 264/112; 264/120; 425/406; 347/87

[58] Field of Search .................................... 264/112, 120; 425/406; 346/140.1; 347/85, 87; 141/18, 383

[56] References Cited

U.S. PATENT DOCUMENTS

| | | | |
|---|---|---|---|
| 4,771,295 | 9/1988 | Baker et al. | 346/1.1 |
| 4,999,652 | 3/1991 | Chan | 347/87 |
| 5,025,271 | 6/1991 | Baker et al. | 346/140 R |
| 5,182,581 | 1/1993 | Kashimura et al. | 346/140 R |
| 5,400,067 | 3/1995 | Day | 347/87 |

FOREIGN PATENT DOCUMENTS

| | | |
|---|---|---|
| 577439 | 5/1993 | European Pat. Off. . |
| 60-245562 | 12/1985 | Japan . |
| 63-87242 | 4/1988 | Japan . |
| 63-281850 | 11/1988 | Japan . |
| 2-34353 | 2/1990 | Japan . |
| 4-357046 | 12/1992 | Japan . |
| 5-692 | 1/1993 | Japan . |
| 5-463 | 1/1993 | Japan . |
| 5-38816 | 2/1993 | Japan . |

*Primary Examiner*—Mary Lynn Theisen
*Attorney, Agent, or Firm*—Fitzpatrick, Cella, Harper & Scinto

[57] ABSTRACT

The invention provides a method and apparatus for manufacturing a liquid container having an enclosed space within an inner wall of the liquid container, the enclosed space filled with a plurality of porous members. The plurality of porous members include a plurality of inner porous members and a plurality of outer porous members. The method includes the step of packing the porous members into the enclosed space so that the inner porous members only contact and press against other inner porous members and/or outer porous members, and the outer porous members contact and press against the inner porous members and the inner wall of the liquid container. The method also comprises a step of compressing the porous members. The apparatus has compressing means for compressing the porous members and packing means for packing the porous members into the liquid container. The invention aims to reduce an amount of non-dischargeable liquid contained by the liquid container by packing porous members into the liquid container with a desired compression distribution. The invention also aims to allow the same kind of porous members to be suitably packed into containers that store liquids having different surface tensions, or containers having different capacities or shapes.

30 Claims, 13 Drawing Sheets

METHOD AND APPARATUS FOR MANUFACTURING A LIQUID CONTAINER HAVING PLURAL POROUS MEMBERS

BACKGROUND OF THE INVENTION

1. Field of the Invention

This invention relates to a method and an apparatus for manufacturing a liquid container having plural porous members for storing a liquid in its internal section and, more particularly, to a method and an apparatus for manufacturing an ink storage container for use in an ink jet recording apparatus.

2. Description of the Related Art

Conventionally, ink storage containers for storing ink used in ink jet recording apparatuses are constructed so that a single ink storage foam member having a volume at least approximately equal to the capacity of an ink storage section is disposed in the container body as a high-molecular elastic porous member for storing a liquid, as disclosed in Japanese Laid-Open Publication No. 87242/1988 and Japanese Utility Model Laid-Open Publication No. 692/1993.

Such an elastic porous member can stably supply ink if the amount of pores and the compression of the porous member are set to suitable values, as disclosed in, for example, Japanese Patent Laid-Open Publication No. 38816/1993. Accordingly, it is necessary to insert such an elastic porous member into this kind of container with the greatest possible care.

As a method for providing an elastic porous material in an ink storage container, a method such as that disclosed in Japanese Patent Laid-Open Publication No. 357046/1992 is known in which an elastic porous material is compressed to a desired size by being pressed with a jig and is thereafter inserted in a container by a piston. A method such as that disclosed in Japanese Patent Laid-Open Publication No. 463/1993 is also known in which a material is compressed along a guide and is thereafter inserted.

The above-described packing method is effective in inserting a single porous member in a container. However, it is difficult to insert a plurality of porous members into an ink storage section while uniformly maintaining the porous members in a compressed state in the case of an arrangement such as that disclosed in Japanese Patent Laid-Open Publication No. 245562/1985 or 34353/1990 wherein the ink storage is formed by plural porous members.

To improve the ink use efficiency of ink stored in the ink storage section of an ink container, the ink container can be constructed with an ink supply port for supplying ink to an ink outlet formed so as to project into the ink container particularly deforming the porous material incorporated therein. In such a case, since the porous material is deformed in the vicinity of the ink supply port, it is difficult to obtain a desired pressure gradient in a peripheral region where the porous material and the inner wall of the container contact each other.

Moreover, in the case of a container which is formed into a complicated shape, e.g., an L-shaped or stepped configuration, it is difficult to insert a porous material uniformly into the container without leaving a gap between the container and the porous material even if the material is formed into a shape similar to that of the container. In such a situation, the ink use efficiency is reduced and an unnecessary space is formed in the container.

Further, in the case of containers used for storing ink having different surface tensions or containers having different ink storage chamber capacities, a plurality of elastic porous materials having various pore rates or container-conforming shapes must be used for packing the container.

SUMMARY OF THE INVENTION

An object of the present invention is to solve the problem that a porous material inserted into in a liquid storage container may not be packed so as to have a desired compression distribution, and that the amount of nondischargeable liquid may be increased.

Another object of the present invention is to solve the problem that a liquid may accumulate in a space not occupied by a porous material because of the internal shape of the container, and that this accumulated liquid may leak out.

Still another object of the present invention is to solve the problem of a need to prepare elastic porous materials having different pore rates or shapes if containers for storing inks differing in surface tension or containers having different capacities or shapes are used.

To achieve the above objects, in accordance with one aspect of the present invention a method of manufacturing a liquid container having an enclosed space within an inner wall of the liquid container, the enclosed space filled with a plurality of porous members including a plurality of inner porous members and a plurality of outer porous members, comprises the steps of packing the porous members into the enclosed space so that the inner porous members only contact and press against other inner porous members and/or outer porous members, and the outer porous members contact and press against the inner porous members and the inner wall of the liquid container and compressing the porous members.

In accordance with another aspect of the present invention an apparatus for manufacturing a liquid container having an enclosed space within an inner wall of the liquid container, the enclosed space filled with a plurality of porous members including a plurality of inner porous members and a plurality of outer porous members so packed that the inner porous members only contact and press against other inner porous members and/or outer porous members and the outer porous members contact and press against the inner porous members and the inner wall of the liquid container, comprises compressing means for compressing the porous members and packing means for packing the porous members into the liquid container.

In accordance with still another aspect of the present invention an apparatus for manufacturing a liquid container having an enclosed space within an inner wall of the liquid container, the enclosed space filled with a plurality of porous members including a plurality of inner porous members and a plurality of outer porous members so packed that the inner porous members only contact and press against other inner porous members and/or outer porous members and the outer porous members contact and press against the inner porous members and the inner wall of the liquid container, comprises a storage section for storing the porous members, packing means for packing the porous members into the liquid container, the packing means having an opening through which the porous members are packed, the opening being movable in a packing direction, transport means for transporting the porous members from the storage section to the packing means, and compressing means for compressing the porous members.

In accordance with yet another aspect of the present invention an apparatus for manufacturing a liquid container having an enclosed space within an inner wall of the liquid container, the enclosed space filled with a plurality of porous members including a plurality of inner porous members and a plurality of outer porous members so packed that the inner porous members only contact and press against other inner porous members and/or outer porous members and the outer porous members contact and press against the inner porous members and the inner wall of the liquid container, comprises a storage section for storing the porous members, compressing means for compressing the porous members, feeding means for feeding the porous members stored in the storage section to the compressing means, a motor for driving the feeding means and the compressing means, packing means for packing the porous members into the liquid container, the packing means having an opening through which the porous members are packed, the opening being movable in a packing direction, and transport means for transporting the porous members from the compressing means to the packing means.

In accordance with yet another aspect of the present invention an apparatus for manufacturing a liquid container having an enclosed space within an inner wall of the liquid container, the enclosed space filled with a plurality of porous members including a plurality of inner porous members and a plurality of outer porous members so packed that the inner porous members only contact and press against other inner porous members and/or outer porous members and the outer porous members contact and press against the inner porous members and the inner wall of the liquid container, comprises a first storage section for storing the porous members, first compressing means for compressing the porous members, first feeding means for feeding the porous members stored in the first storage section to the first compressing means, a first motor for driving the first feeding means and the first compressing means, a second storage section for storing a liquid and impregnating the porous members with the liquid, first transporting means for transporting the porous members from the first compressing means to the second storage section, second compressing means for compressing the liquid-impregnated porous members, second feeding means for feeding the liquid-impregnated porous members to the second compressing means, a second motor for driving the second feeding means and the second compressing means, packing means for packing the liquid-impregnated porous members into the liquid container, the packing means having an opening through which the liquid-impregnated porous members are packed, the opening being movable in a packing direction and second transport means for transporting the liquid-impregnated porous members from the second compressing means to the packing means.

If the above-described methods are adopted, it is possible to set a suitable compression distribution throughout the entire enclosed space of the container.

It is also possible to pack the porous members into any shaped container.

It is also possible to complete the operation of injecting a liquid into the liquid container at the same time as completing the operations of compressing and packing the porous members into the liquid container.

These and other objects, features and advantages of the invention will become more apparent upon a consideration of the following detailed description of preferred embodiments of the present invention taken in conjunction with the accompanying drawings.

DESCRIPTION OF THE PREFERRED EMBODIMENTS

Figure 1:
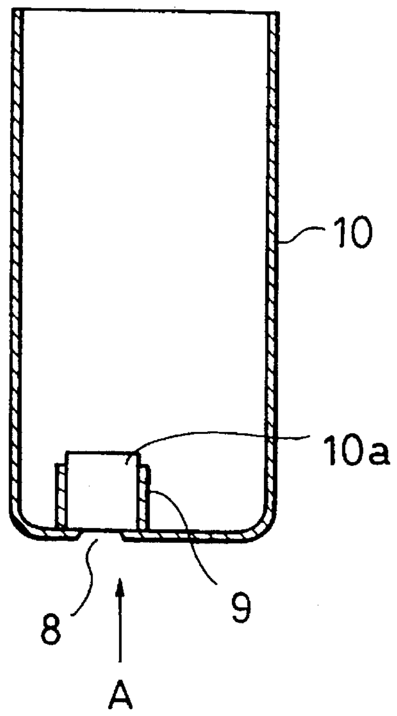
FIG. 1 is a schematic cross-sectional view of a main casing of a liquid container manufactured in accordance with the present invention.
Figure 2:
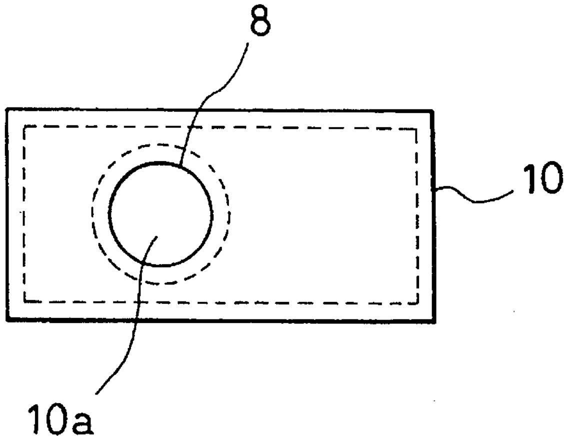
FIG. 2 is a schematic diagram of the liquid container casing viewed in the direction of arrow A in FIG. 1.

FIGS. 1 and 2 show a liquid container which is filled with a porous material by a liquid container manufacturing method in accordance with the present invention. Referring to FIG. 1, the liquid container has a container body 10 and a liquid outlet 8 for discharging a liquid stored in the liquid container.

A liquid inducer 10*a* is provided which serves to improve the effect of discharging the liquid stored in the liquid container. A liquid inducer holding wall 9 is provided to hold the liquid inducer 10*a*. These components are also illustrated in FIG. 2, showing a view in a direction of arrow A from the container bottom side of FIG. 1.

The shape and construction of the container to which the present invention is applied are not limited to those shown in FIGS. 1 and 2. The shape of the container may alternatively be such that, in the arrangement shown in FIG. 1, a filter is provided in an end portion of the container surrounded by the liquid inducer holding wall while the liquid inducer 10*a* is removed. Also, it is not necessary to form the container into the shape of a rectangular parallelepiped having a rectangular cross section as shown in FIG. 2.

Figure 3:
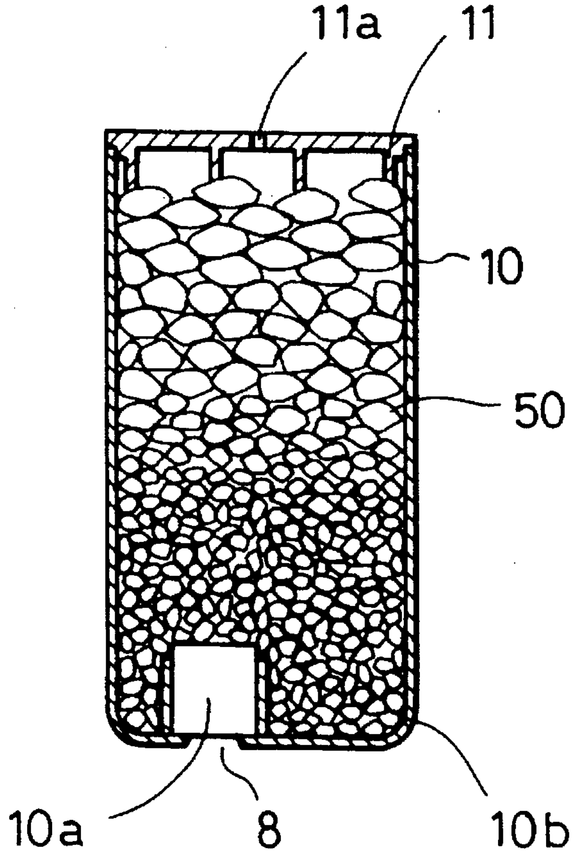
FIG. 3 is a schematic cross-sectional view of an example of a liquid container manufactured in accordance with the present invention.

FIG. 3 shows an example of a liquid container manufactured as an ink tank or the like for use in an ink jet recording apparatus in accordance with the present invention. A member 11 shown in FIG. 3 is a lid for closing an opening through which a porous material is inserted into the liquid container. An atmospheric air vent 11*a* is formed in the lid 11 to provide an air communication between the interior of the liquid container and the outside air.

A plurality of porous members of a high molecular elastic material 50 are provided in the liquid container. Each porous member 50 is formed so as to be sufficiently small in comparison with the capacity of the liquid container. Porous members 50 are packed in such a manner that inner porous members 50 located, for example, in the vicinity of a center of the container contact only other porous members 50, while outer porous members 50 located, for example, in the vicinity of the inner wall of the liquid container contact both the inner porous members 50 and the inner wall of the liquid container 10*b*.

Porous member 50 may have any size and shape as long as the porous members 50 can be disposed in a row between any inner wall portions of the ink container in opposed positions. The shape of each porous member 50 is not limited to a particular shape such as the shape of a rectangular prism or a sphere, and plural porous members 50 may vary in size and shape. Porous members 50 will hereinafter be referred to as porous flakes.

As described above, the means for maintaining a liquid in accordance with the present invention is not a single piece of a porous material having a size such as to generally occupy the entire cavity of the container but plural porous flakes. The porous flakes are packed in the liquid container in such as manner as to contact each other in a compressed state.

Preferably, porous flakes 50 are formed with certain degrees of uniformity in size and shape if the liquid container of the present invention is adapted to, for example, an ink jet recording apparatus so as to satisfy a need to supply ink to the ink jet recording apparatus stably and reliably.

Processes of manufacturing the above-described liquid container will be described as embodiments of the present invention in detail with reference to the drawings. In each embodiment, each porous flake has a 5 mm square size.

(First Embodiment )

Figure 4A:
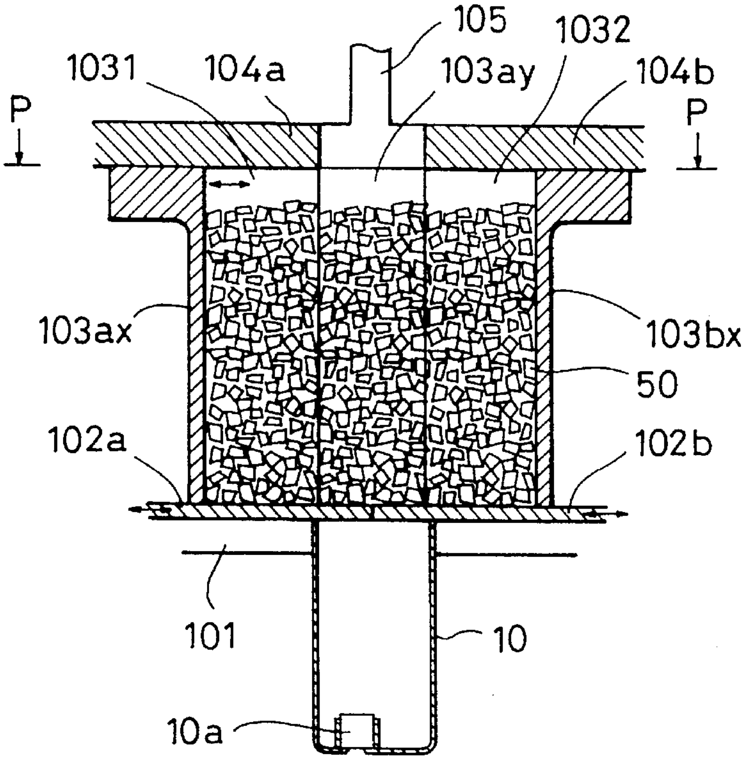
FIGS. 4(*a*) and 4(*b*) are schematic cross-sectional views of a porous material packing machine and a liquid container casing, showing an initial stage of a first embodiment of the process of manufacturing a liquid container in accordance with the present invention.
Figure 4B:
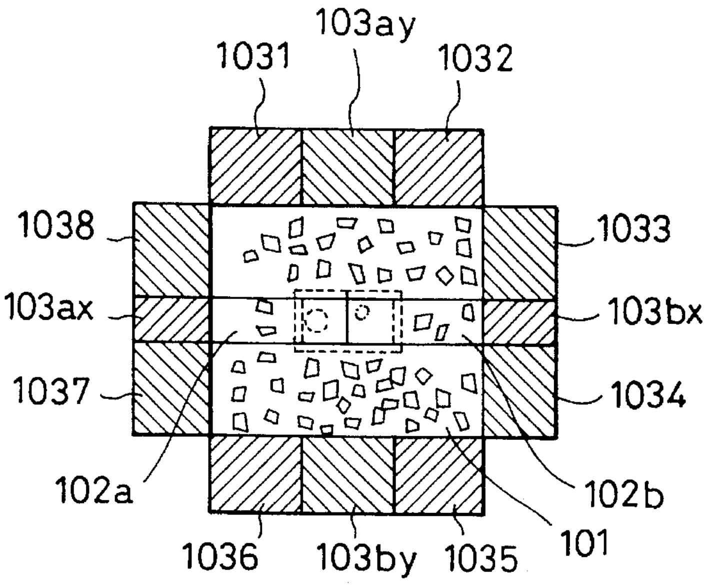
Figure 5A:
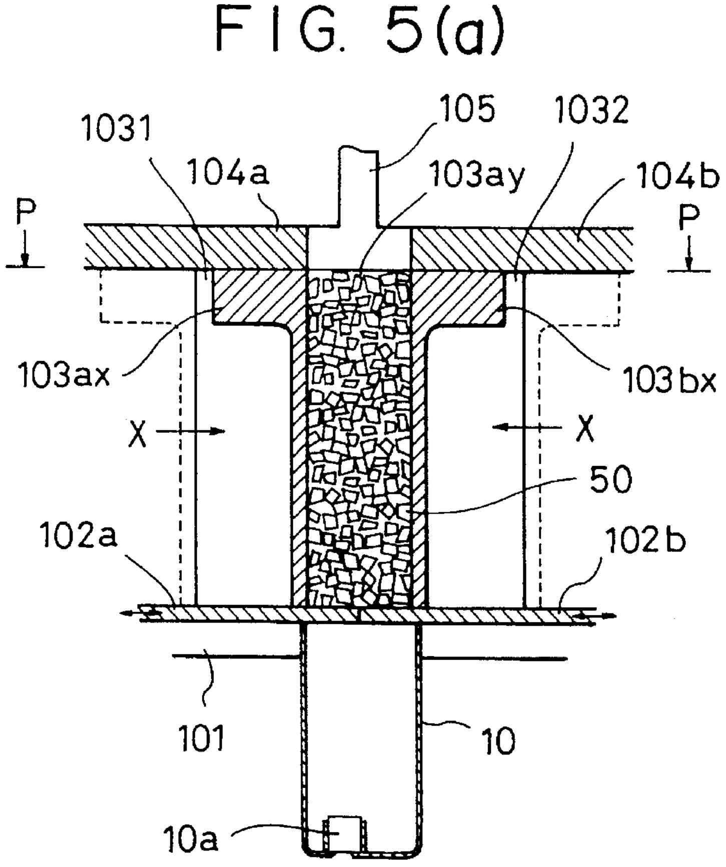
FIGS. 5(*a*) and 5(*b*) are schematic cross-sectional views of the porous material packing machine and the liquid container casing, showing an example of a compressing step in the first embodiment of the liquid container manufacturing process in accordance with the present invention.
Figure 5B:
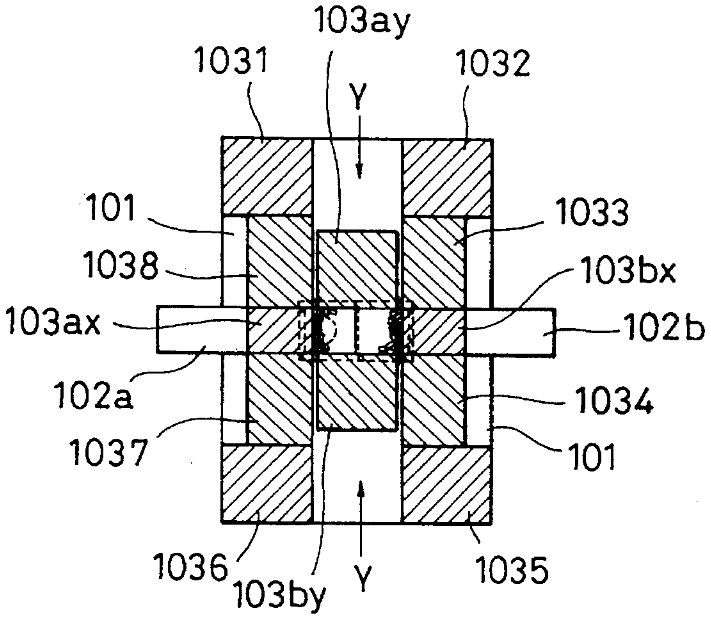
Figure 6A:
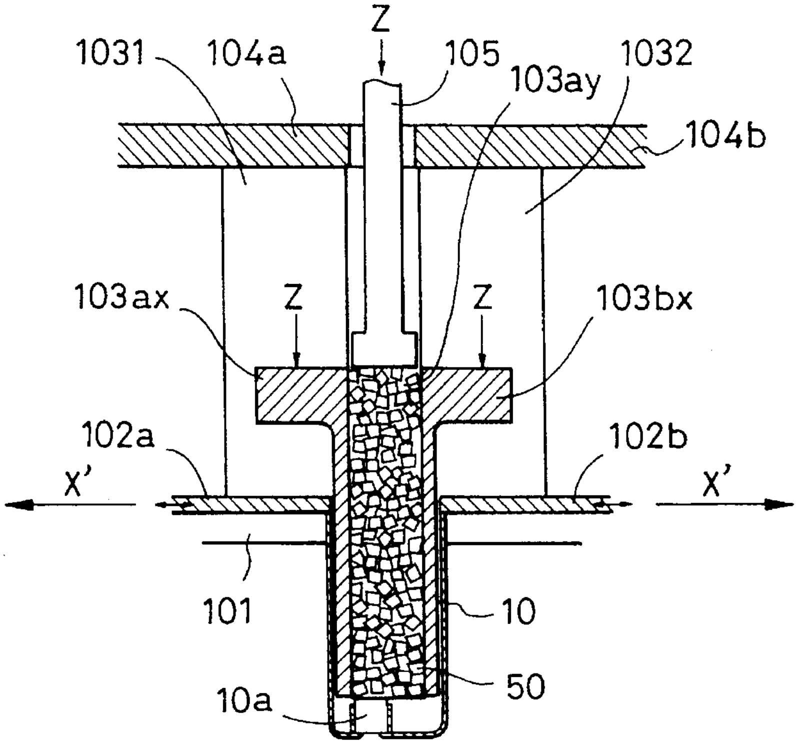
FIGS. 6(*a*) and 6(*b*) are schematic cross-sectional views of the porous member packing machine and the liquid container casing, showing an example of steps of packing and compressing the porous member in the first embodiment of the liquid container manufacturing process in accordance with the present invention.
Figure 6B:
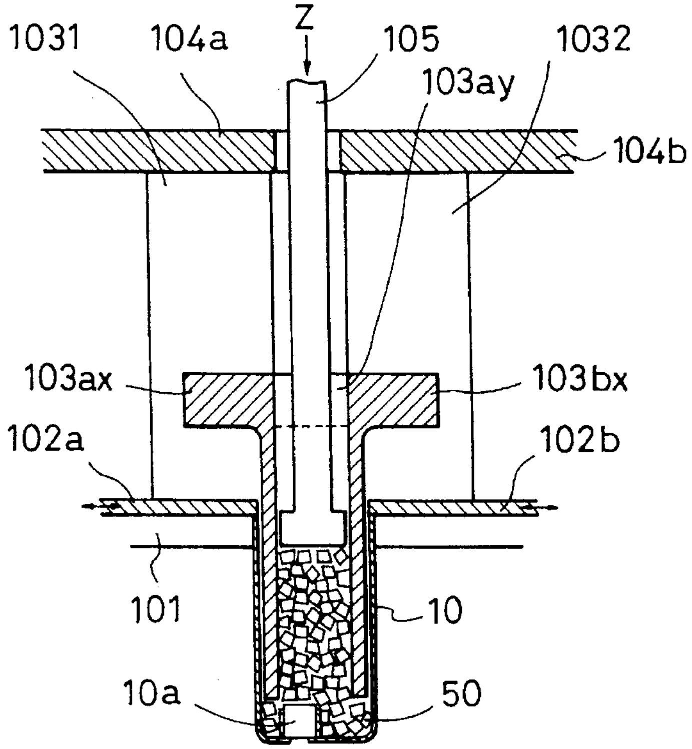

FIGS. 4, 5, and 6 show the first embodiment of the method of manufacturing the liquid container of the present invention. FIGS. 4(*a*) and 4(*b*) illustrate a process step of supplying a porous flake packing apparatus with porous flakes 50 which are to be packed in the liquid container. FIG. 4(*a*) is a schematic cross-sectional view of the porous flake packing apparatus, and FIG. 4(*b*) is a schematic cross-sectional view taken along the line P—P of FIG. 4(*a*). FIGS. 5 and 6 illustrate steps of compressing and packing the porous flakes into the liquid container.

Referring to FIGS. 4(*a*) and 4(*b*), a member 101 is a fitting guide for fitting the liquid container body 10 to the porous flake packing apparatus, and members 102*a* and 102*b* are movable plates. Members 1033, 1034, 103*bx*, 1037, 1038 and 103*ax* are movable plates for compressing porous flakes along the longitudinal direction of the cross section of the liquid container shown in FIG. 4(*b*).

Members 103*ay* and 103*by* are movable plates for compressing porous flakes along a direction perpendicular to the above-mentioned longitudinal direction. Members 1031, 1032, 1035 and 1036 are fixed walls, which also serve as guides for the movements of the movable plates along the above-mentioned two directions.

In this embodiment, porous flakes are compressed along the above-mentioned longitudinal direction and are thereafter compressed along the direction perpendicular to the longitudinal direction. However, this order of moving these movable plates to compress the porous flakes may also be reversed by changing the above-mentioned fixed walls 1031, 1032, 1035 and 1036 to movable walls, and changing the moveable members 1033, 1034, 1037 and 1038 to fixed walls.

Referring again to FIG. 4(*a*), members 104*a* and 104*b* are movable lids, and a member 105 is a piston for compressing porous flakes in the direction of the height of the liquid container. The movable plates 102*a* and 102*b*, the fitting guide 101 and the movable and fixed walls form a chamber for compressing porous flakes. To supply porous flakes to the packing apparatus, one of or both of the movable lids 104*a* and 104*b* are moved. An amount of porous flakes to be supplied is determined by a required factor of the liquid container, i. e., capacity, compression, capillary force, etc.

The compressing and packing steps will next be described with reference to FIGS. 5 and 6. FIG. 5(*a*) is a schematic cross-sectional view of the porous flake packing machine in a compressing step, and FIG. 5(*b*) is a schematic cross-sectional view taken along the line P—P of FIG. 5(*a*). FIGS. 6(*a*) and 6(*b*) are schematic cross-sectional views of the porous flake packing machine packing and compressing porous flakes in the liquid container respectively.

As mentioned above, the movable walls 1033 (not shown), 1034 (not shown), 103*bx*, 1037 (not shown), 1038 (not shown) and 103*ax* are moved in the directions of arrows X in FIG. 5(*a*) for compression along the longitudinal direction of the liquid container shown in FIG. 2. Thereafter, the movable walls 103*ay* and 103*by* are moved in the directions of arrows Y in FIG. 5(*b*), i.e., in the directions along the shorter sides of the cross section of the liquid container shown in FIG. 2, thereby completing the operation of compressing the porous flakes along the two directions.

At this time, the members 103*ax*, 103*bx*, 103*ay* and 103*by* form a packing guide for packing the compressed porous flakes in the liquid container.

Piston 105 is then moved in the direction of arrow Z in FIG. 6(*a*) along with the movable walls 103*ax*, 103*bx*, 103*ay*, and 103*by* (not shown) forming the packing guide. Also, the movable plates 102*a* and 102*b* move laterally in the direction of arrow X' in FIG. 6(*a*) to enable the packing guide to be inserted into the liquid container. During this operation, the porous flakes are in contact with each other in a compressed state such as to press against the movable walls 103*ax*, 103*bx*, 103*ay* and 103*by* and, therefore, do not fall into the liquid container.

After the packing guide has been fully inserted into the liquid container, the piston 105 is moved in the direction of arrow Z to compress the porous flakes, as shown in FIG. 6(*b*). Consequently, the porous flakes have now been compressed along three directions consisting of the two horizontal directions and the vertical direction of the liquid container, thereby completing the compressing step. Thereafter, while the piston 105 is being maintained in the state shown in FIG. 6(*b*), the packing guide is lifted in the direction opposite of arrow Z. After the packing guide has been fully lifted out of the containers, the piston 105 is lifted out of the container. When piston 105 is above the movable plates 102*a* and 102*b*, the movable plates move laterally in a direction opposite of arrow X' to complete the step of packing the porous flakes.

After the completion of the above-described compressing and packing steps, the lid 11 is affixed to the liquid container by ultrasonic welding or the like, thereby completing the process of manufacturing the liquid container.

In the above-described embodiment, the liquid container manufacturing process is used which includes the compressing step of compressing a plurality of porous flakes and the packing step of packing the porous flakes in such a manner that inner porous flakes contact only other porous flakes, whereby the porous material can be packed throughout the entire enclosed space of the liquid container no matter what internal configuration the container has.

Further, it is possible to change the capacity and the compression of the liquid container as desired only by changing the amount of porous flakes packed into the container. There is a low probability of the porous flakes being compressed non-uniformly in the liquid container. Accordingly, the problem of an increase in the amount of nondischargeable ink due to a locally high compression of the porous flakes in the liquid container can be substantially overcome.

Figure 14:
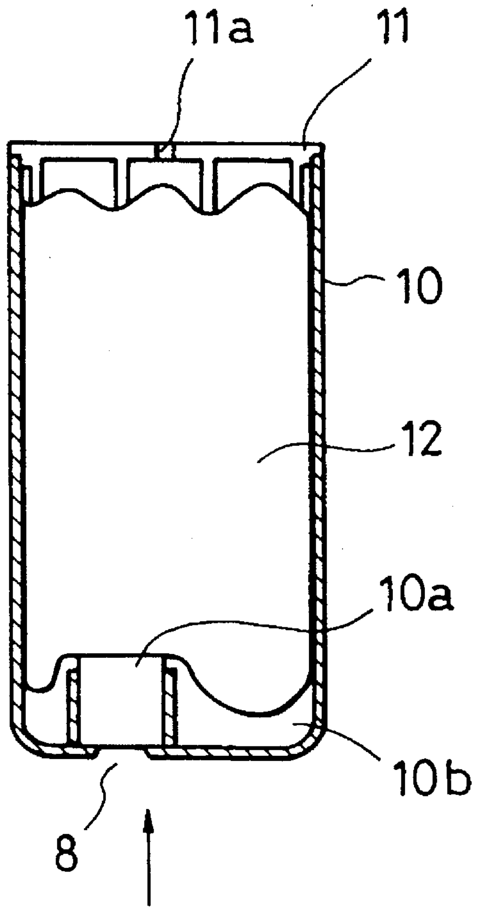
FIG. 14 PRIOR ART
FIG. 14 is a schematic diagram of a conventional liquid container incorporating a high-molecular elastic porous material member.

In this embodiment, the liquid outlet portion in which a liquid outlet opening is formed projects into the container, as shown in the conventional arrangement shown of FIG. 14. It is therefore possible to set a compression gradient in the vicinity of the liquid outlet at the time of packing and compressing as shown in FIGS. 6(*a*) and 6(*b*), respectively.

(Second Embodiment)

Figure 7:
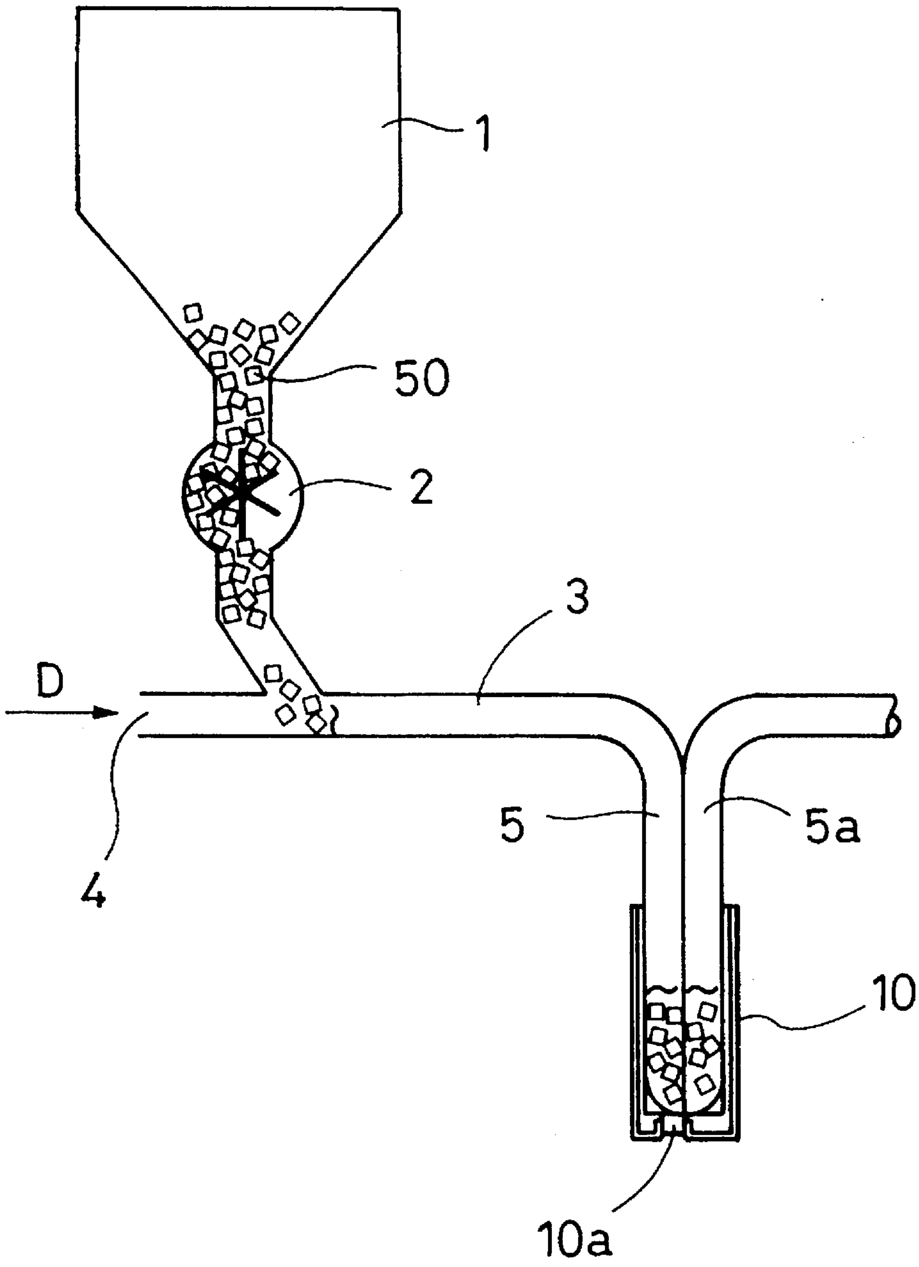
FIG. 7 is a schematic cross-sectional view of a porous material packing machine and a liquid container casing, showing a second embodiment of the liquid container manufacturing process in accordance the present invention.
Figure 8A:
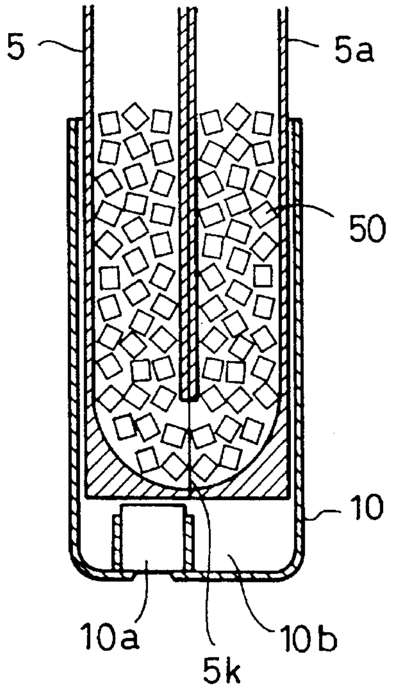
FIGS. 8(*a*) through 8(*d*) are schematic diagrams showing a procedure of packing and compressing the porous members in accordance with the second embodiment of the present invention.
Figure 8B:
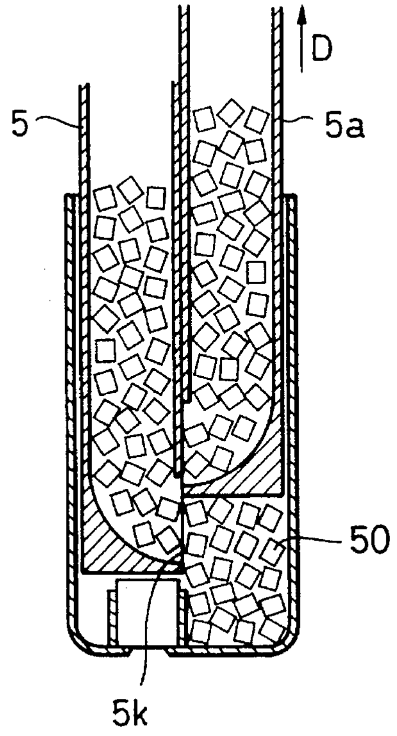
Figure 8C:
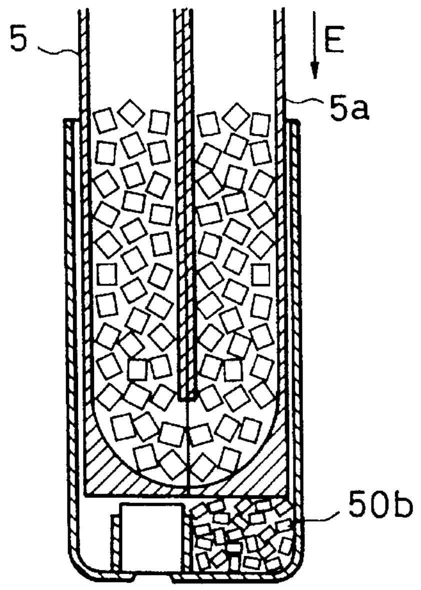
Figure 8D:
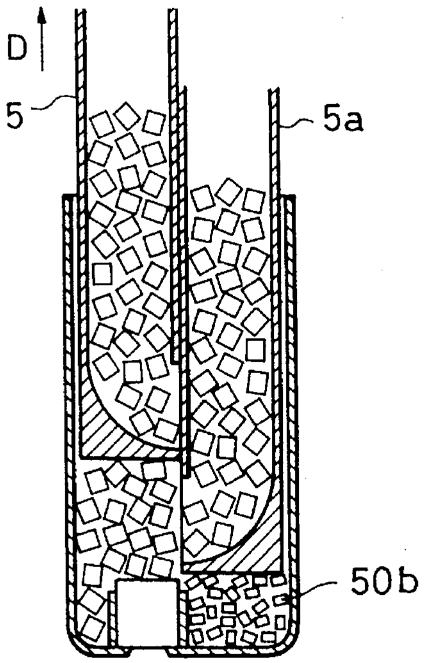
Figure 9A:
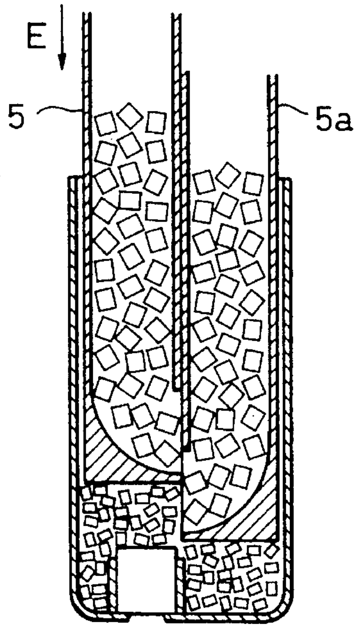
FIGS. 9(*a*) through 9(*d*) are schematic diagrams showing a porous member packing and compressing procedure subsequent to the procedure shown in FIGS. 8(*a*) through 8(*d*)
Figure 9B:
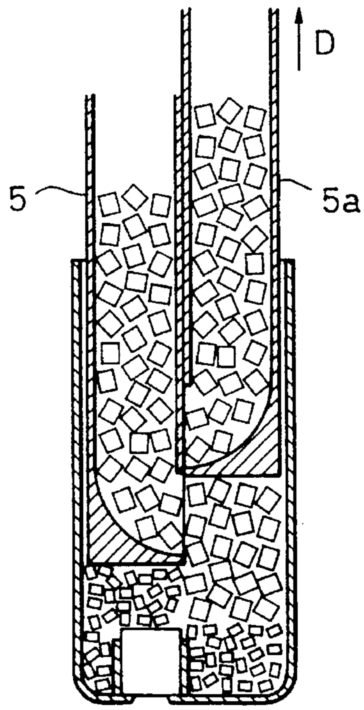
Figure 9C:
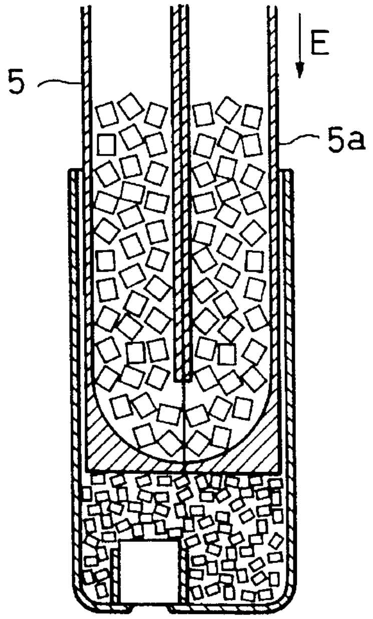
Figure 9D:
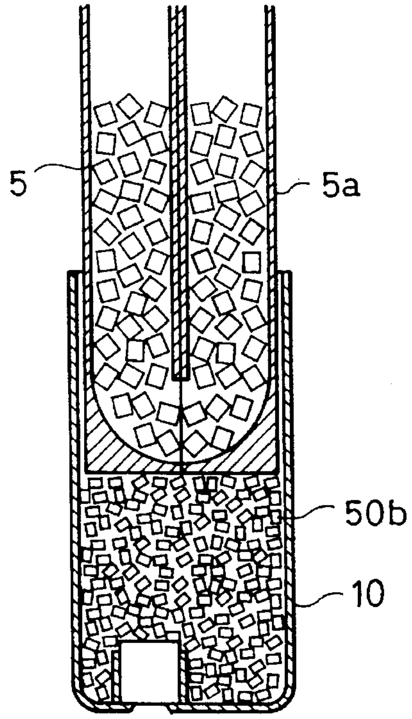

FIG. 7 is a schematic sectional view of a porous material packing machine in the second embodiment of the liquid container manufacturing method of the present invention.

Referring to FIG. 7, a hopper 1 for storing porous flakes 50 is provided. A rotary valve 2 serves to check reverse flow of porous flakes 50 and to supply porous flakes 50 at a constant rate. Supply nozzles 5 and 5*a* are used to insert porous flakes 50 in the liquid container body 10. Porous flakes 50 are transported to the liquid container through a piping 3 serving as supply means of porous flakes 50 from the hopper 1 to the container 10. The piping 3 is provided with an air inlet 4 through which air for transporting porous flakes is introduced into the piping 3.

Porous flakes 50 discharged from the hopper 1 through the rotary valve 2 are transported to the supply nozzle 5 through the flexible piping 3 by air pressurized in the direction of arrow D in FIG. 7. Also, other porous flakes 50 are transported from another hopper (not shown) to the supply nozzle 5*a*. Both the supply nozzles 5 and 5*a* are inserted into the liquid container body 10 to pack the elastic porous material into the liquid container.

Preferably, when the porous material is packed, the interior of the liquid container is decompressed or evacuated by a suitable means to ensure that porous flakes can be suitably inserted into the liquid container.

Porous flakes may be transported by a method different from that described above. For example, a method of transporting porous flakes by evacuating or decompressing only the liquid container body may be used. A similar method may also be used in which the liquid container and the piping on the liquid container side as viewed from the hopper 1 are evacuated or decompressed to transport porous flakes. In such a case, decompressed sections may be arranged at a certain number of positions in the piping to set a decompression gradient such that the degree of vacuum is higher at a position closer to the liquid container.

Such a transport method is effective in preventing porous flakes from scattering away from the supply nozzle when the liquid container is detached. This transport method reliably controls the rate at which porous flakes are supplied, in comparison with a simple air pressure transport method.

A manufacturing process having a step of packing porous flakes and a step of compressing porous flakes in accordance with this embodiment will be described with reference to FIGS. 8 and 9.

FIG. 8(*a*) illustrates a state where the supply nozzles 5 and 5*a* are inserted in the liquid container as shown in FIG. 7. Two supply nozzles are used in this embodiment but the number of supply nozzles is not limited to two.

However, if only one supply nozzle is used, it is necessary to control a pressure balance of porous flakes to prevent an increase in the amount of porous flakes 50 above the predetermined amount due to porous flakes 50 falling from the supply nozzle. If two supply nozzles are used as in this embodiment, a supply opening 5*k* is ordinarily maintained in a closed state, so that porous flakes in the nozzles cannot fall. Therefore, arrangements using two or more supply nozzles of which supply openings face each other such a way to make a pair are more preferable than an arrangement using only one supply nozzle.

After the supply nozzles have been inserted into the liquid container, the supply nozzle 5*a* is first lifted in the direction of arrow D until the opening 5*k* of the supply nozzle 5 is completely exposed to the inside of the container, as shown in FIG. 8(*b*). The drive source for lifting the supply nozzle may be, for example, an air cylinder or a ball screw driven by a motor. A ball screw is more preferable if the operations described below are used.

A predetermined amount of porous flakes 50 from the supply nozzle 5 is supplied to the container. The predetermined amount of porous flakes supplied in this case is controlled through air pressure and the operation of the rotary valve 2. If it is necessary to control the amount supplied with higher accuracy, a screw type extruder or the like may be used.

As shown in FIG. 8(*c*), the supply nozzle 5*a* is next moved downward in the direction of arrow E towards the lower end of the supply nozzle 5 compressing porous flakes 50 into a state 50*b*. The position to which the supply nozzle 5*a* is moved downward, and which determines the compression of porous flakes 50, is not necessarily set to the lower end of the supply nozzle 5. Ordinarily, with respect to containers used in ink jet recording apparatuses, the compression is set to 3 to 6 times although it may be changed according to the surface tension of ink.

To pack porous flakes 50 under the supply nozzle 5, the supply nozzle 5 is lifted until the opening of the supply nozzle **5*a* is completely exposed to the inside of the container, as shown in FIG. 8**(*d*), and a predetermined amount of porous flakes 50 is supplied from the supply nozzle 5 to the container.

Thereafter, the supply nozzle 5 is moved downward until the porous flakes 50 are compressed at the desired compression, as shown in FIG. 9(*a*).

The supply nozzle **5*a* is then lifted until the opening 5*k* of the supply nozzle 5 is completely exposed and is then moved downward towards the lower end of the supply nozzle 5 to compress the porous flakes, as shown in FIGS. 9**(*b*) and 9(*c*), as in the case of the steps shown in FIGS. 8(*b*) and 8(*c*).

These steps are successively repeated until a state shown in FIG. 9(*d*) is established, and the supply nozzles 5 and **5*a* are thereafter lifted. Thus, in the process of this embodiment, the step of inserting porous flakes and the step of compressing porous flakes are repeated. In this process, before the insertion step is started after the completion of the compressing step, a resilient force acts on compressed porous flakes 50*b* in the direction parallel to the movement of the supply nozzles to restore the original shape of porous flakes 50. Such a force, however, also acts on adjacent compressed porous flakes 50*b*** in horizontal directions perpendicular to the direction in which each supply nozzle is moved to compress the porous flakes. There is, therefore, no possibility of the shape of the porous flakes being restored to a non-compressed size before the next compressing step is started.

After porous flakes 50 have been packed in the liquid container body 10 in the above-described manner, lid 11 having atmospheric air vent **11*a* is affixed to the liquid container body 10 by ultrasonic welding or the like, as shown in FIG. 3**. The liquid container manufacturing process is thereby completed.

The compression of porous flakes **50*b*** in the vicinity of the atmospheric vent hole may be reduced slightly by the resilient force acting in the supply nozzle insertion direction. However, the compression in the vicinity of the atmospheric air vent is always lower than the compression in the vicinity of the liquid outlet. Therefore, the influence of the restoration of the porous flakes upon the liquid supply efficiency is small. On the other hand, it is possible that the porous flakes loosened or relaxed from their compressed state will function like a buffer chamber to prevent liquid leaking through the atmospheric air vent.

In this embodiment, two nozzles are provided as porous member packing means and porous member compressing means. It is therefore possible to simplify the arrangement of the members needed to be inserted into the container and use the manufacturing apparatus for a smaller liquid container. It is also possible to increase the force for pressing porous flakes along the direction perpendicular to the direction of insertion of the supply nozzles in comparison with the case of using only one supply nozzle. Therefore, the compression adjustment range can be extended.

In this embodiment, it is possible to adjust and optimize the process with respect to a change in the container shape or compression only by controlling the porous flake supply rate or the amount of compression applied by the supply nozzles.

Increasing the compression of the porous material in the vicinity of the liquid outlet having liquid inducer **10*a*** to improve the ink use efficiency in the liquid container can be achieved by setting the amount of compression applied by the supply nozzles in the vicinity of the liquid outlet. The control of a pressure distribution of this embodiment can be performed more simply and accurately in comparison with the first embodiment.

Also, the accuracy with which the ratio of ordinary compression in the liquid container is set can be adjusted by controlling the amount of porous flakes supplied during cycles of the packing and compressing steps. It is therefore possible to achieve a more uniform compression distribution of porous flakes through the entire internal space of the container in comparison with the conventional art.

Also, in comparison with the first embodiment, the manufacturing process can be controlled with respect to a wider compression rate range of the liquid container, since the method of loading porous flakes and thereafter compressing the porous flakes is adopted.

(Third Embodiment)

Figure 10A:
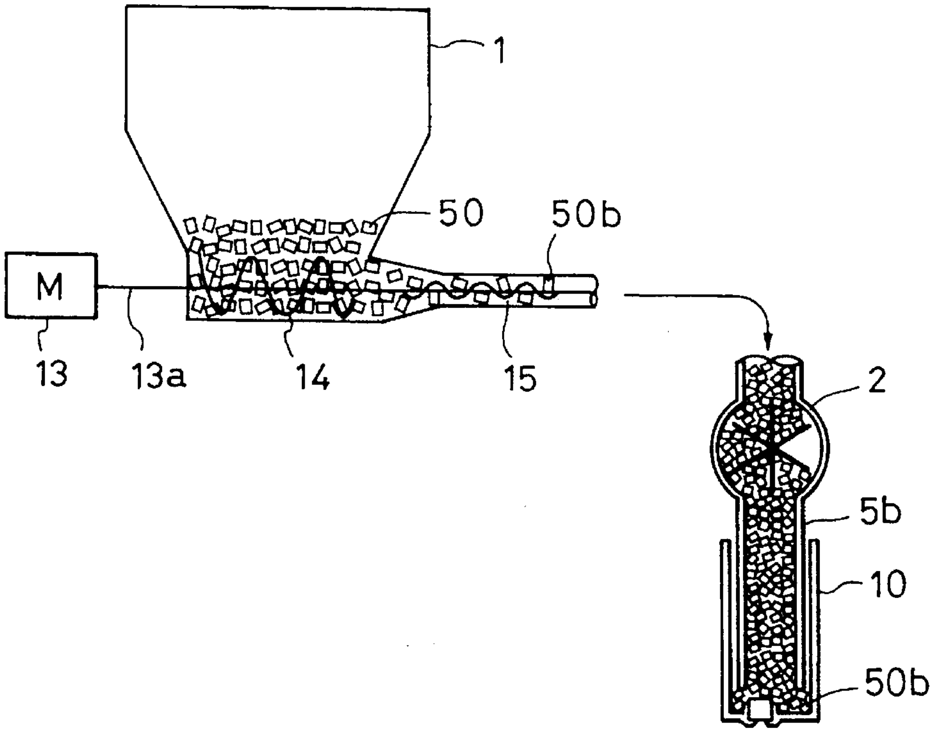
FIGS. 10(*a*) and 10(*b*) are schematic cross-sectional views of a packing machine used in a third embodiment of the process of manufacturing a liquid container incorporating high-molecular elastic porous material members in accordance with the present invention.
Figure 10B:
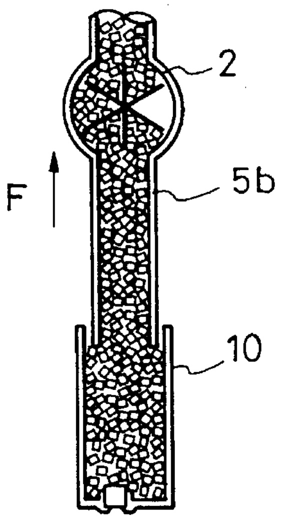

FIGS. 10(*a*) and 10(*b*) are schematic sectional views of a porous material packing machine in accordance with the third embodiment of the method of manufacturing the high molecular liquid container of the present invention. FIG. 10(*a*) shows an initial stage of packing, and FIG. 10(*b*) shows a state when packing is completed.

A hopper 1 is provided in which a feed screw 14 and a compressing screw 15 are incorporated. The feed screw 14 and the compressing screw 15 are connected to a drive shaft **13*a* of a motor 13 provided outside the hopper 1. The feed screw 14 feeds porous flakes 50 stored in the hopper 1 to the section where the compressing screw 15** is provided.

Porous flakes 50 are compressed by the compressing screw 15 to obtain compressed porous flakes **50*b*. The compression in this case is determined by considering the restoration after the compression of the porous flakes so that the porous flakes are compressed at a desired compression when packed in the liquid container body 10 after being supplied through a transport passage (not shown) from the compressing screw 15**.

The feed screw 14 and the compressing screw 15 differ from each other in pitch and external configuration. The compressing screw may have a construction in which the diameter of a shaft is constant while the feed pitch of a screw portion is gradually reduced, a construction in which a constant-pitch screw is formed on a tapered shaft the diameter of which is gradually reduced, or a construction based on the combination of the former two types of constructions.

Even if only one supply nozzle is used, porous flakes can be prevented from falling at the opening of supply nozzle because the compressed porous flakes are supplied by the compressing screw so that the porous flakes compress each other by pressing the inner wall of the transport passage piping.

However, the porous flakes may fall which will depend upon the relationship between the size of the porous flakes and the transport speed. In this embodiment, rotary valve 2 is mounted in the passage from the compressing screw to the supply nozzle **5*b* to reliably prevent falling. The rotary valve 2 is constructed to transmit the transport pressure by setting the length of blades in the rotary valve to such a value that the blades do not contact the inner surface of the valve. The rotary valve 2** controls the amount of compression applied to the porous flakes and the transport speed or the rate at which porous flakes are supplied.

In this embodiment, porous flakes **50*b* are compressed at several kg/cm$^2$ on the hopper 1 side of the rotary valve 2 by the compressing screw 15, while on the supply nozzle 5*b* side they restore their original shape to such an extent as to press against the inner wall of the supply nozzle 5*b*** so that they do not fall because of gravity.

Accordingly, by using the rotary valve 2 disposed in the vicinity of the supply nozzle, it is possible to control the porous flake 50 supply rate and amount of compression applied even if the length of the transport piping is long.

The operation of this embodiment will now be described. First, the supply nozzle **5*b* is inserted into the liquid container body 10, as shown in FIG. 10**(*a*). In this state, the motor 13 and the rotary valve 2 are operated to extrude compressed porous flakes **50*b* from the supply nozzle 5*b* into the liquid container. While the porous flakes are being extruded, the supply nozzle 5*b* is lifted in the direction of arrow F to control the compression of porous flakes 50*b* filling the liquid container body 10** so that the compression is substantially constant.

After the container body has been filled with the desired amount of porous flakes as shown in FIG. 10(*b*), the motor 13 and the rotary valve 2 are stopped and the supply nozzle **5*b* is further lifted out of the container. The operation of packing porous flakes 50 is thereby completed and a lid is affixed to the liquid container body 10** by ultrasonic welding or the like, as in the case of the second embodiment, thus completing the liquid container.

In this embodiment, the supply nozzle **5*b* is lifted while the compressed porous flakes 50*b* are extruded. However, there is no need to move the supply nozzle 5*b* if the height of the liquid container body 10** is small.

If the above-described manufacturing method is used, it is possible to pack porous flakes into the entire internal space of the liquid container as well as to optimize the process with respect to the desired container shape and the desired compression. Moreover, the above-described method ensures that porous flakes can be packed more uniformly in comparison with the methods of the first and second embodiments.

In the first to third embodiments, no liquid is injected into the liquid container when the liquid container is manufactured. Ink is injected into the liquid container in the form illustrated in FIG. 3. A method may be used to inject ink in which a gas in the container is drawn through the liquid outlet 8 to provide a vacuum or a condition closer to a vacuum in the container, and ink is injected through the liquid outlet 8 with pressure.

(Fourth Embodiment)

Figure 11A:
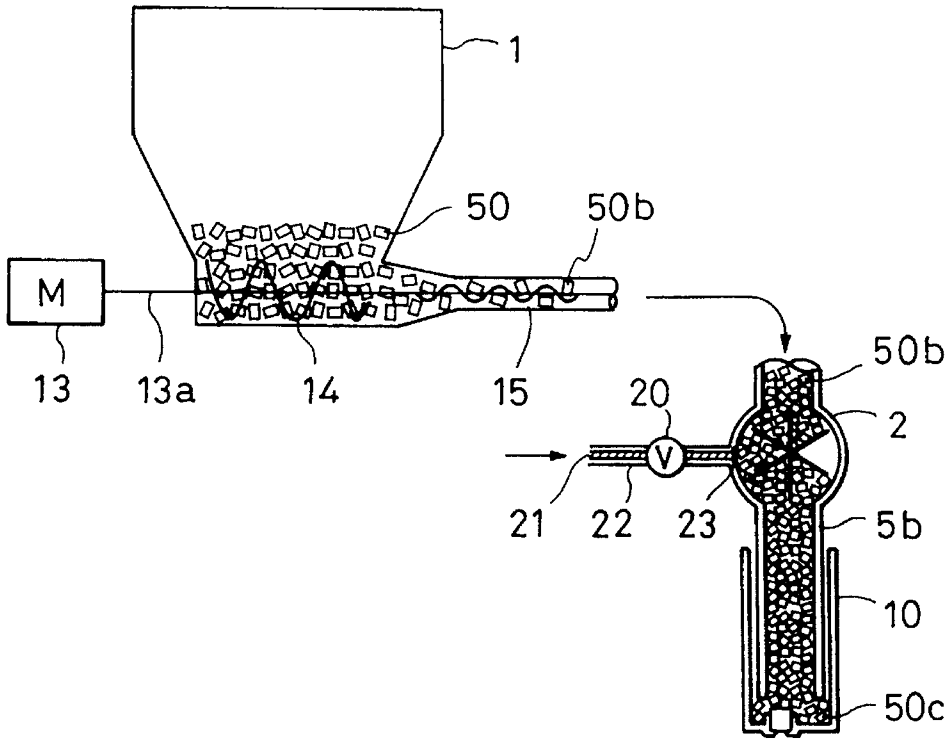
FIGS. 11(*a*) and 11(*b*) are schematic cross-sectional views of a packing machine used in a fourth embodiment of the process of manufacturing a liquid container incorporating high-molecular elastic porous material members in accordance with the present invention.
Figure 11B:
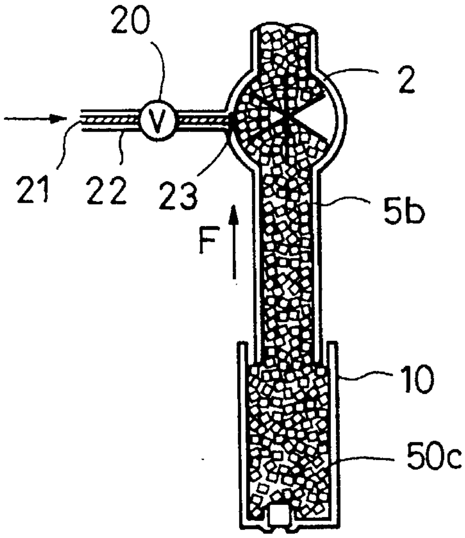

FIGS. 11(*a*) and 11(*b*) are schematic sectional views of an elastic porous material packing machine in accordance with the fourth embodiment of the liquid container manufacturing method of the present invention. FIG. 11(*a*) shows an initial stage of packing while FIG. 11(*b*) shows a state when packing is completed.

The construction of the packing machine is similar to that of the third embodiment. However, the construction of this embodiment differs from those described above in that a liquid piping 22 is connected to an intermediate portion of the rotary valve 2, and a filter 23 and a check valve 20 are provided in the piping 22 to prevent compressed porous flakes **50*b* from flowing into the piping 22 from the rotary valve 2**.

The operation of this embodiment will be described. Porous flakes 50 pass through the feed screw and the compressing screw while being compressed in the same manner as in the third embodiment. Compressed porous flakes **50*b* are extruded into the rotary valve 2 and are mixed at the intermediate portion of the rotary valve with a liquid 21 supplied from the liquid piping 22**.

Ordinarily, if a high molecular elastic porous material having open cells for storing a liquid is immersed in the liquid in a compressed state, the liquid is taken into the high molecular elastic porous material when the compression of the material is moderated.

The compression is moderated before and after the rotary valve 2, as mentioned above. Therefore, an arrangement is adopted in which the rotary valve 2 is used as pressure moderating means and the liquid is supplied to the porous flakes at the intermediate portion of the rotary valve 2. The liquid is thereby introduced into porous flakes **50*b* to obtain liquid-impregnated porous flakes 50*c***.

Thereafter, in the same process steps as in the third embodiment, the liquid container body 10 is filled with liquid-impregnated porous flakes **50*c*, the supply nozzle 5*b* is lifted in the direction of arrow F out of the liquid container, and the lid is affixed to the liquid container body 10** by ultrasonic welding or the like, thereby completing the liquid container.

While in this embodiment the liquid injection is completed before the porous flake insertion step, the operation of the liquid injection step is performed after the completion of the liquid container in the first to third embodiments. In the first to third embodiments, therefore, the step of evacuating the liquid container and injecting the liquid is provided to cause a sufficient amount of the liquid to permeate into the high-molecular elastic porous material.

In this embodiment, the liquid permeates into the porous flakes in the rotary valve 2. Therefore, the liquid container is completely filled with ink when it is filled with the porous material. That is, the step of injecting the liquid during transport from the compressing step to the packing step is combined, so that the total number of steps is reduced and the productivity is improved.

(Fifth Embodiment)

Figure 12:
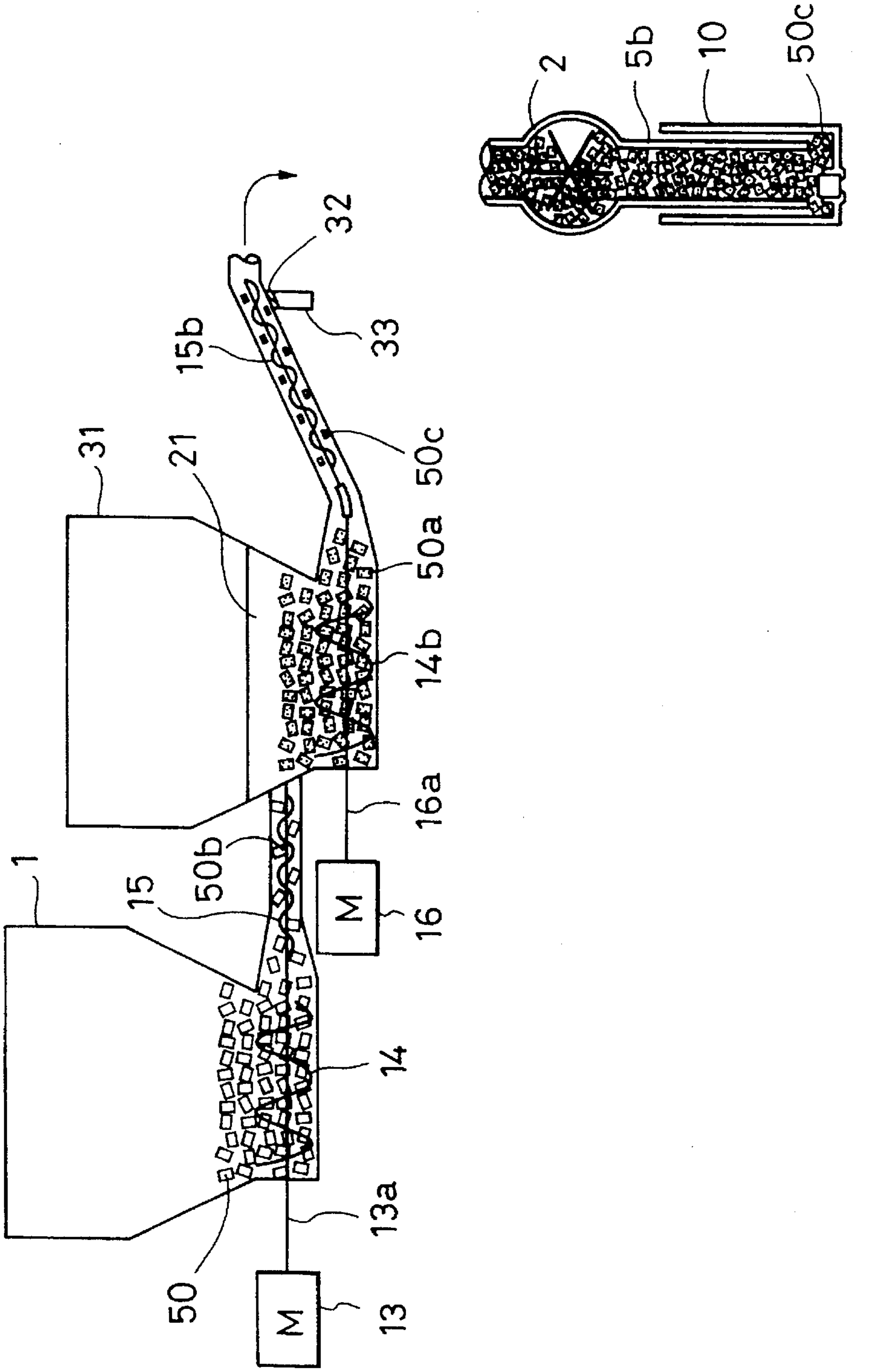
FIG. 12 is a schematic cross-sectional view of a packing machine used in a fifth embodiment of the process of manufacturing a liquid container incorporating high-molecular elastic porous material members in accordance with the present invention.

FIG. 12 is a schematic cross-sectional view of a porous material packing machine in accordance with the fifth embodiment of the liquid container manufacturing method of the present invention. Hoppers 1 and 31 in which feed screws 14, **14*b*, and compressing screws 15, 15*b* are incorporated, respectively, are provided. The feed screws 14, 14*b* and the compressing screws 15, 15*b* are respectively connected to drive shafts 13*a*, 16*a* of motors 13, 16 provided outside the hoppers 1 and 31**.

The feed screw 14 feeds porous flakes 50 stored in the hopper 1 to the section where the compressing screw 15 is provided. Porous flakes **50*b* compressed by the compressing screw 15 are supplied to the liquid hopper 31. Liquid 21 to be injected into the liquid container is stored in the liquid hopper 31. Compressed porous flakes 50*b*** having open cells abruptly restore to their original shape so that the liquid permeates into the porous flakes.

The feed screw **14*b* feeds porous flakes 50*a* thereby impregnated with the liquid to the compressing screw 15*b*. Liquid-impregnated porous flakes 50*a* are compressed by the compressing screw 15*b* to form compressed liquid-impregnated porous flakes 50*c*. The amount of compression applied by the compressing screw 15***b* is set by considering the restoration of compressed liquid-impregnated porous flakes 50*c* so that they are compressed to a desired compression when packed in the liquid container body 10. Compressed liquid-impregnated porous flakes 50*c* are supplied to the supply nozzle 5*b* through a piping (not shown).

Because the liquid oozes out of compressed liquid-impregnated porous flakes 50*c* during compression by the compressing screw 15*b*, a waste liquid nozzle 33 is attached to the compressing section through a filter 32 to discharge the liquid oozing out.

In this embodiment, since only one supply nozzle 5*b* is used, a rotary valve 2 is provided on the upstream side of the supply nozzle 5*b* for the purpose of preventing porous flakes 50*c* from falling into the liquid container and ensuring a constant-compression characteristic even through the piping length is large. However, this arrangement need not be exclusively adopted. After packing the porous flakes, the liquid container is completed in the same manner as in the above-described embodiments.

In this embodiment, porous flakes 50 are compressed to at a substantially large ratio and are thereafter restored substantially to the initial state. Therefore, the liquid can permeate sufficiently into inner portions of porous flakes 50.

If the porous flakes are passed through the liquid hopper 31 several times, they can be impregnated with the liquid more completely.

In this embodiment, the porous flakes can be substantially completely restored from the compressed state when impregnated with the liquid. Therefore, the amount of ink absorbed in each porous flake can be larger than that in the fourth embodiment. Accordingly the amount of liquid stored in the liquid container can be increased.

(Sixth Embodiment)

Figure 13A:
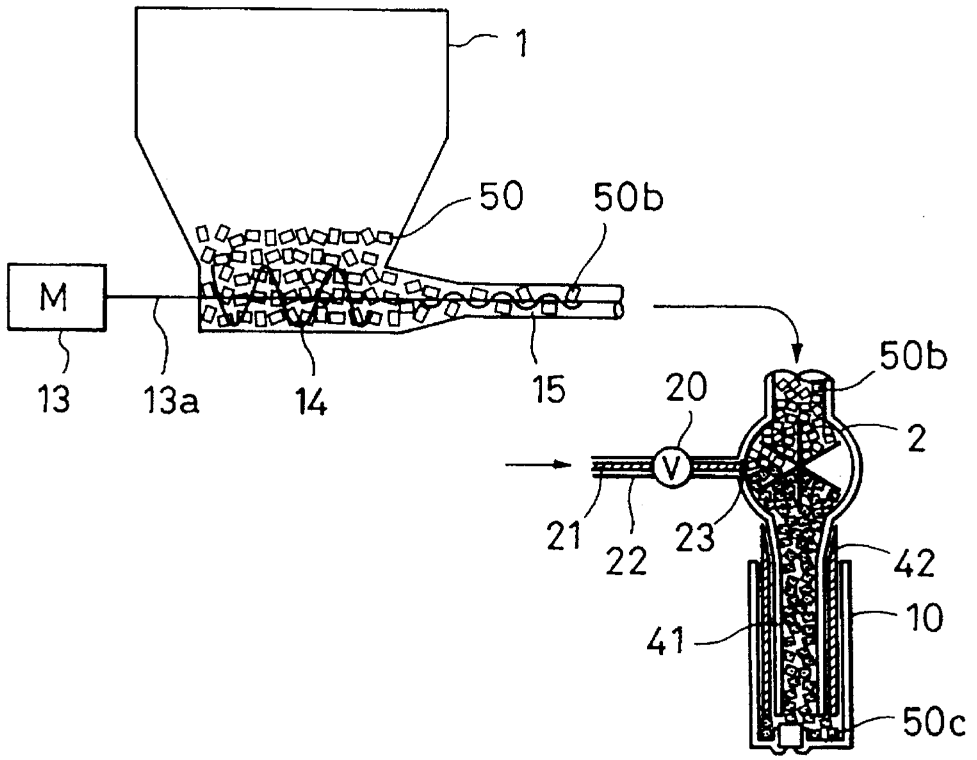
FIGS. 13(*a*) and 13(*b*) are schematic cross-sectional views of a packing machine used in a sixth embodiment of the process of manufacturing a liquid container incorporating high-molecular elastic porous material members in accordance with the present invention.
Figure 13B:
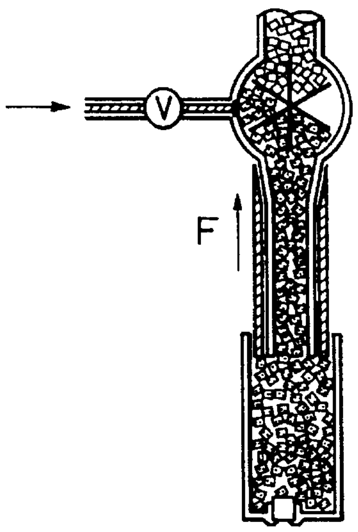

FIGS. 13(*a*) and 13(*b*) are schematic sectional views of an elastic porous material packing machine in accordance with the sixth embodiment of the liquid container manufacturing method of the present invention. FIG. 13(*a*) shows an initial stage of packing while FIG. 13(*b*) shows a state when packing is completed.

In this embodiment, the supply nozzle 5*b* is formed of a cylindrical pipe 41 and a porous flake pressing member 42 (adjuster). The supply nozzle 5*b* can be adapted to containers having various shapes by changing the porous flake pressing member 42. In other respects, this embodiment is generally the same as the above-described embodiments.

Because the cylindrical pipe 41 smaller in diameter than the piping connected between the hopper 1 and the rotary valve 2 is used, the critical pressing force applied to the wall surface prevent porous flakes 50*b* from falling is reduced, so that the fall prevention reliability is improved.

The arrangement of this embodiment can be applied to any method using only one supply nozzle for supplying porous flakes to the liquid container.

(Seventh Embodiment)

In the case of manufacturing the liquid container shown in FIG. 3 by one of the above-described manufacturing methods, it is possible that the compression of compressed porous flakes 50*b* in the vicinity of the atmospheric air vent will be reduced by the resilience force acting toward the lid 11.

Therefore, to form the interface between the atmospheric air and the liquid in the vicinity of the atmospheric air vent more positively, this embodiment uses a process step in which the liquid is not supplied to the rotary valve at the time when porous flakes are to be packed in the vicinity of the opening of the liquid container. Thus, porous flakes which are not impregnated with the liquid are packed using the liquid container manufacturing apparatus shown in FIG. 11 in the vicinity of the atmospheric air vent.

By this process step, the compression of the porous flakes impregnated with the liquid can generally be made more uniform. Since there is no possibility of the rate of compression of the porous flakes impregnated with the liquid becoming higher than the rate of compression in the vicinity of the liquid outlet, an effect of stabilizing the supply of the liquid particularly at the initial state can be achieved, as well as a buffer effect.

In the third to seventh embodiments, supply nozzle 5*b* is lifted at a constant speed while compressed porous flakes 50*b* are extruded from supply nozzle 5*b*, whereby the rate of compression of porous flakes 50*b* inserted into the liquid container 10 can be made uniform.

However, as mentioned above with respect to the second embodiment, there is also a need to increase the compression of porous flakes 50*b* or liquid-impregnated porous flakes 50*c* on the liquid inducer 10*a* side in order to sufficiently discharge the liquid contained in the liquid container so that the operational efficiency of the contained liquid can be improved.

In the third to sixth embodiments, an increase or decrease in the compression can be achieved by controlling the apparatus as described below.

To gradually increase the compression, the speed at which supply nozzle 5*b* is lifted while extruding compressed porous flakes 50*b* or liquid-impregnated porous flakes 50*c* from supply nozzle 5*b* is lowered at a position closer to the liquid inducer 10*a*. To gradually reduce the compression, the speed at which the opening of the supply nozzle is moved is gradually increased. In this manner, the compression of the elastic porous material in the liquid container can be adjusted in accordance with the desired distribution.

As described above, it is possible to form a packing density distribution in the container such that the density is higher on the liquid outlet side by controlling the speed at which the porous material is inserted in the container so that insertion speed varies between the charging start point and the inserting completion point. Reliable liquid supply is thereby achieved.

In the case of the conventional liquid container storing a high-molecular elastic porous material as shown in FIG. 14, space 10*b* around liquid inducer 10*a* in a lower section of liquid container body is not filled with high-molecular porous material 12. A liquid is accumulated in space 10*b* and can easily leak out of the container, also reducing the amount of liquid contained in the high-molecular porous material 12. In contrast, if one of the porous flake packing methods described above with respect to the first to sixth embodiments of the invention is used, porous flakes 50 can fill the space 10*b* as shown in FIG. 3, thereby increasing the containable liquid amount as well as preventing leakage.

As described above, according to the manufacturing method of the present invention, the porous material to be provided in the liquid container for storing a liquid can be packed so as to have a uniform or a desired compression distribution. It is therefore possible to reduce the amount of the nondischargeable liquid in the container.

By using the manufacturing method of the present invention, it is possible to pack the porous material throughout the entire internal space of the container regardless of the internal configuration of the container. There is a low probability of the liquid leaking out of the container.

Further, according to the present invention, there is no need to prepare elastic porous members varying in pore rate and shape when containers for storing liquids differing in surface tension or containers differing in capacity or shape are used. Various liquid containers can be manufactured by using the same type of elastic porous member.

Further, in the manufacturing method of the present invention, the liquid injection step can be completed along with the porous material packing step and the compressing step. The process for manufacturing the liquid container can therefore be shortened and the productivity can be remarkably improved.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the invention as hereinafter claimed. The scope of the following claims is to be accorded the broadest interpretation so as to encompass all such modifications, and equivalent structures and functions.

What is claimed is:

1. A method of manufacturing a liquid container having an enclosed space within an inner wall of the liquid container, the enclosed space filled with a plurality of porous members including a plurality of inner porous members and a plurality of outer porous members, said method comprising the steps of:

packing the porous members into the enclosed space so that the inner porous members contact and press against other inner porous members and/or outer porous members, and the outer porous members contact and press against the inner porous members and the inner wall of the liquid container; and compressing the porous members.

2. A method according to claim 1, wherein said packing step is performed after said compressing step.

3. A method according to claim 1, wherein an amount of compression that the porous members are compressed in the compressing step varies.

4. A method according to claim 1, further comprising a step of sealing the liquid container.

5. A method according to claim 1, wherein the porous members include a plurality of liquid-impregnated porous members.

6. A method according to claim 1, wherein said compressing step comprises a first substep of compressing the porous members in a horizontal direction and in a direction coplanar with and perpendicular to said horizontal direction and a second substep of compressing the porous members in a vertical direction, and said packing step further comprises substeps of inserting a packing column containing porous members compressed by said first compressing substep into the liquid container before said second compressing substep is performed and removing said packing column as to leave the porous members in the liquid container after said second compressing substep is completed.

7. A method according to claim 1, wherein said packing step packs a predetermined number of the porous members into the enclosed space of the liquid container a plurality of times and said compressing step compresses the porous members after each said time.

8. A method according to claim 7, wherein said packing step packs the porous members into the liquid container through an opening of at least one packing means moving in a packing direction.

9. A method according to claim 8, wherein said opening moves at a speed so controlled as to provide a predetermined compression gradient in the porous members in the liquid container.

10. A method according to claim 8, wherein said compressing step compresses the porous members using compressing means comprising at least one packing means moving in a direction opposite to said packing direction.

11. A method according to claim 10, wherein an amount of compression that the porous members are compressed in said compressing step is so controlled as to provide a predetermined compression gradient in the porous members in the liquid container.

12. A method according to claim 8, further comprising a step of transporting through a piping the porous members from a storage section where the porous members are stored to at least one said packing means by pressurized air.

13. A method according to claim 8, further comprising a step of transporting through a piping the porous members from a storage section where the porous members a stored to at least one said packing means by reducing a pressure in said liquid container and in said piping.

14. A method according to claim 2, further comprising the step of controlling an amount of compression of the porous members, said compression controlling step occurring after said compressing step.

15. A method according to claim 14, wherein said compression controlling step is performed by means for controlling a supply rate at which the porous members are supplied to the liquid container.

16. A method according to claim 14, wherein the compression controlling step further comprises a step of supplying a liquid to the porous members.

17. A method according to claim 14, wherein the compressing step and the compression controlling step are performed successively for a certain number of times.

18. An apparatus for manufacturing a liquid container having an enclosed space within an inner wall of the liquid container, the enclosed space filled with a plurality of porous members including a plurality of inner porous members and a plurality of outer porous members so packed that the inner porous members contact and press against other inner porous members and/or outer porous members and the outer porous members contact and press against the inner porous members and the inner wall of the liquid container, said apparatus comprising:

compressing means for compressing the porous members; and packing means for packing the porous members into the liquid container.

19. An apparatus according to claim 18, wherein said compressing means compress the porous members in a horizontal direction, a direction coplanar with and perpendicular to said horizontal direction and a vertical direction.

20. An apparatus according to claim 19, wherein said compressing means also act as said packing means.

21. An apparatus according to claim 18, further comprising means for sealing the liquid container filled with compressed porous members.

22. An apparatus for manufacturing a liquid container having an enclosed space within an inner wall of the liquid container, the enclosed space filled with a plurality of porous members including a plurality of inner porous members and a plurality of outer porous members so packed that the inner porous members contact and press against other inner porous members and/or outer porous members and the outer porous members contact and press against the inner porous members and the inner wall of the liquid container, said apparatus comprising:

a storage section for storing the porous members;

packing means for packing the porous members into the liquid container, said packing means having an opening through which the porous members are packed, said opening being movable in a packing direction;

transport means for transporting the porous members from the storage section to said packing means; and compressing means for compressing the porous members.

23. An apparatus according to claim 22, further comprising means for controlling a supply rate of the porous members to said packing means.

24. An apparatus according to claim 22, wherein said packing means also act as said compressing means by moving in a direction opposite of said packing direction.

25. An apparatus for manufacturing a liquid container having an enclosed space within an inner wall of the liquid container, the enclosed space filled with a plurality of porous members including a plurality of inner porous members and a plurality of outer porous members so packed that the inner porous members contact and press against other inner porous members and/or outer porous members and the outer porous members contact and press against the inner porous members and the inner wall of the liquid container, said apparatus comprising:

a storage section for storing the porous members;

compressing means for compressing the porous members;

feeding means for feeding the porous members stored in said storage section to said compressing means;

a motor for driving said feeding means and said compressing means;

packing means for packing the porous members into the liquid container, said packing means having an opening through which the porous members are packed, said opening being movable in a packing direction; and transport means for transporting the porous members from said compressing means to said packing means.

26. An apparatus according to claim 25, further comprising means for controlling a supply rate of the porous members to said packing means.

27. An apparatus according to claim 26, further comprising means for supplying a liquid to the porous members.

28. An apparatus according to claim 27, wherein said liquid supplying means supplies a liquid to the porous members in said supply rate controlling means.

29. An apparatus for manufacturing a liquid container having an enclosed space within an inner wall of the liquid container, the enclosed space filled with a plurality of porous members including a plurality of inner porous members and a plurality of outer porous members so packed that the inner porous members contact and press against other inner porous members and/or outer porous members and the outer porous members contact and press against the inner porous members and the inner wall of the liquid container, said apparatus comprising:

a first storage section for storing the porous members;

first compressing means for compressing the porous members;

first feeding means for feeding the porous members stored in said first storage section to said first compressing means;

a first motor for driving said first feeding means and said first compressing means;

a second storage section for storing a liquid and impregnating the porous members with said liquid;

first transporting means for transporting the porous members from said first compressing means to said second storage section;

second compressing means for compressing liquid-impregnated porous members;

second feeding means for feeding the liquid-impregnated porous members to said second compressing means;

a second motor for driving said second feeding means and said second compressing means;

packing means for packing the liquid-impregnated porous members into the liquid container, said packing means having an opening through which the liquid-impregnated porous members are packed, said opening being movable in a packing direction; and second transport means for transporting the liquid-impregnated porous members from said second compressing means to said packing means.

30. An apparatus according to claim 29, further comprising means for controlling a supply rate of the liquid-impregnated porous members to said packing means.

* * * * *

UNITED STATES PATENT AND TRADEMARK OFFICE

CERTIFICATE OF CORRECTION

PATENT NO. : 5,567,373

DATED : October 22, 1996

INVENTOR(S) : OSAMU SATO, ET AL.

It is certified that error appears in the above-identified patent and that said Letters Patent is hereby corrected as shown below:

ON THE TITLE PAGE

Item [56] "577439 5/1993 Euro. Pat. Off." should read --577439 1/1994 Euro. Pat. Off.--.

COLUMN 5

Line 52, "as" (first occurrence) should read --a--.

COLUMN 13

Line 51, "smaller" should read --is smaller--.
Line 54, "prevent" should read --to prevent--.

UNITED STATES PATENT AND TRADEMARK OFFICE
CERTIFICATE OF CORRECTION

PATENT NO. : 5,567,373

DATED : October 22, 1996

INVENTOR(S) : OSAMU SATO, ET AL.

It is certified that error appears in the above-identified patent and that said Letters Patent is hereby corrected as shown below:

COLUMN 16

Line 25, "a" (second occurrence) should read --are--.
Line 58, "compress" should read --compresses--.
Line 62, "act" should read --acts--.

COLUMN 17

Line 21, "act" should read --acts--.

Signed and Sealed this

Twenty-second Day of April, 1997

Attest:

BRUCE LEHMAN

*Commissioner of Patents and Trademarks*

*Attesting Officer*